United States Patent
Mendonsa et al.

(10) Patent No.: US 12,456,504 B2
(45) Date of Patent: Oct. 28, 2025

(54) MOVABLE MAGNETIC PARTICLE MEMORY DEVICE

(71) Applicant: Seagate Technology LLC, Fremont, CA (US)

(72) Inventors: Riyan Alex Mendonsa, Edina, MN (US); Brett R. Herdendorf, Shakopee, MN (US); Jon D. Trantham, Chanhassen, MN (US)

(73) Assignee: Seagate Technology LLC, Fremont, CA (US)

( * ) Notice: Subject to any disclaimer, the term of this patent is extended or adjusted under 35 U.S.C. 154(b) by 247 days.

(21) Appl. No.: 17/937,620

(22) Filed: Oct. 3, 2022

(65) Prior Publication Data

US 2024/0112711 A1 Apr. 4, 2024

(51) Int. Cl.
*G11C 11/16* (2006.01)

(52) U.S. Cl.
CPC ........ *G11C 11/161* (2013.01); *G11C 11/1673* (2013.01); *G11C 11/1675* (2013.01)

(58) Field of Classification Search
CPC .............. G11C 11/161; G11C 11/1673; G11C 11/1675
USPC ......................................................... 365/158
See application file for complete search history.

(56) References Cited

U.S. PATENT DOCUMENTS

| | | | | |
|---|---|---|---|---|
| 5,843,567 A | * | 12/1998 | Swift | H01H 1/027 428/323 |
| 7,732,881 B2 | * | 6/2010 | Wang | H10N 50/10 365/158 |
| 2005/0079551 A1 | * | 4/2005 | Mizuno | G11B 5/855 435/7.1 |
| 2007/0285843 A1 | * | 12/2007 | Tran | G11C 13/025 360/245.9 |
| 2008/0230826 A1 | * | 9/2008 | Das | H10B 41/30 257/E21.209 |
| 2009/0009156 A1 | * | 1/2009 | Duric | G01R 33/12 324/202 |
| 2015/0199177 A1 | * | 7/2015 | Braganca | G06F 7/582 365/158 |
| 2021/0225438 A1 | * | 7/2021 | Yu | H10N 60/80 |
| 2023/0301115 A1 | * | 9/2023 | Mendonsa | H10N 50/01 324/252 |

OTHER PUBLICATIONS

Abedini-Nassab et al.; "High-throughput precise particle transport at single-particle resolution in a three-dimensional magnetic field for highly sensitive bio-detection"; 2022; 15 pages; https://www.nature.com/articles/s41598-022-10122-1.

(Continued)

*Primary Examiner* — Ly D Pham

(57) ABSTRACT

A data storage apparatus is presented that includes a well structure comprising a suspension medium, and a magnetic particle disposed in at least a portion of the well structure. A control system is configured to represent a data state corresponding to a positioning of the magnetic particle within the well structure, the magnetic particle moved responsive to an applied field and a present material state of the well structure. Various addressable arrays of well structures and associated control elements can be established to form data storage devices.

17 Claims, 10 Drawing Sheets

(56) References Cited

OTHER PUBLICATIONS

Bao et al.; "Magnetic Nanoparticles: Material Engineering and Emerging Applications in Lithography and Biomedicine"; PMC Jan. 2017; 86 pages; https://www.ncbi.nlm.nih.gov/pmc/articles/PMC4646229/.
Gruneis et al.; "Detecting Individual Electrons Using a Carbon Nanotube Field-Effect Transistor"; Nov. 21, 2007; 8 pages; https://pubs.acs.org/doi/10.1021/nl072243w (Abstract only).
Ka Lok Chjiu; "Thermal diffusion of organic semiconductors determined by scanning photothermal deflection (SPD) technique"; Hong Kong Baptist University; Master's Thesis; Jul. 14, 2020; 143 pages.
Knight, Will; "Proteins produce nano-magnetic computer memory"; Apr. 27, 2003; 3 pages; https://www.newscientist.com/article/dn3664-proteins-produce-nano-magnetic-computer-memory/.
Meyer et al.; "Giant magnetoresistance effects in gel-like matrices"; Smart materials and structures 22.2 (2013): 025032; 4 pages (Abstract).
Mgrdichian, Laura,; "Single-Molecule Magnets Open New Door for Information Technology"; Mar. 9, 2009; 2 pages; https://phys.org/news/2009-03-single-molecule-magnets-door-technology.html.
Mgrdichian, Laura; "New Organic Gold-Nanoparticle Memory Device"; Feb. 14, 2007; 2 pages; https://phys.org/news/2007-02-gold-nanoparticle-memory-device.html.
P. Vavassori et al.; "Magnetic nanostructures for the manipulation of individual nanoscale particles in liquid environments (invited)"; Journal of Applied Physics 107, 2010; 6 pages.
Teich et al."Hybrid Molecular and Spin Dynamics Simulations for Ensembles of Magnetic Nanoparticles for Magnetoresistive Systems." Sensors 15.11 (2015): 28826-28841.
Teich, Lisa, et al. "Efficient Calculation of Low Energy Configurations of Nanoparticle Ensembles for Magnetoresistive Sensor Devices by Means of Stochastic Spin Dynamics and Monte Carlo Methods." Acta Physica Polonica, A. 127.2 (2015).
Teich, Lisa, et al. "Modeling of nanoparticular magnetoresistive systems and the impact on molecular recognition." sensors 15.4 (2015): 9251-9264.
Usov et al.; "Magnetic nanoparticle motion in external magnetic field; Journal of Magnetism and Magnetic Materials"; vol. 385, Jul. 1, 2015; pp. 339-346; https://www.sciencedirect.com/science/article/abs/pii/S0304885315002565.
Van Ommering; "Dynamics of individual magnetic particles near a biosensor surface"; Technische Universiteit Eindhoven; 2010; https://pure.tue.nl/ws/files/2849143/658494.pdf.

* cited by examiner

MOVABLE MAGNETIC PARTICLE MEMORY DEVICE

SUMMARY

In certain implementations, a data storage apparatus can include a well structure comprising a suspension medium. A magnetic particle can be disposed in at least a portion of the well structure. A control system can be configured to represent a data state corresponding to a positioning of the magnetic particle within the well structure, the magnetic particle moved responsive to an applied field and a present material state of the well structure.

In certain implementations, a system can include an array of well structures comprising a suspension medium and each having a magnetic particle disposed therein. A field generator can be configured to selectively apply a field to at least a portion of the array. Well connections can conductively couple each of the well structures to a control element. The control element can be configured to direct selective application of the field to the array and store data states by altering positioning of the magnetic particles within the well structures, and read the data states over the well connections as electrical properties of the well structures.

In certain implementations, a method can include obtaining write data to store at a write address and identifying well structures within an array of well structures as corresponding to the write address. The method can include determining altered positioning for magnetic particles embedded in the well structures to represent the write data and directing an increase in thermal states of suspension material comprising the well structures to alter corresponding material states of the well structures. The method can include applying a field to the well structures with altered material states to move the magnetic particles in accordance with the altered positioning.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

In the following detailed description of certain embodiments, reference is made to the accompanying drawings with example implementations. It is to be understood that features of the embodiments, implementations, and examples herein can be combined, exchanged, or removed, and other embodiments may be utilized or created with corresponding structural changes without departing from the scope of the present disclosure.

Figure 1:
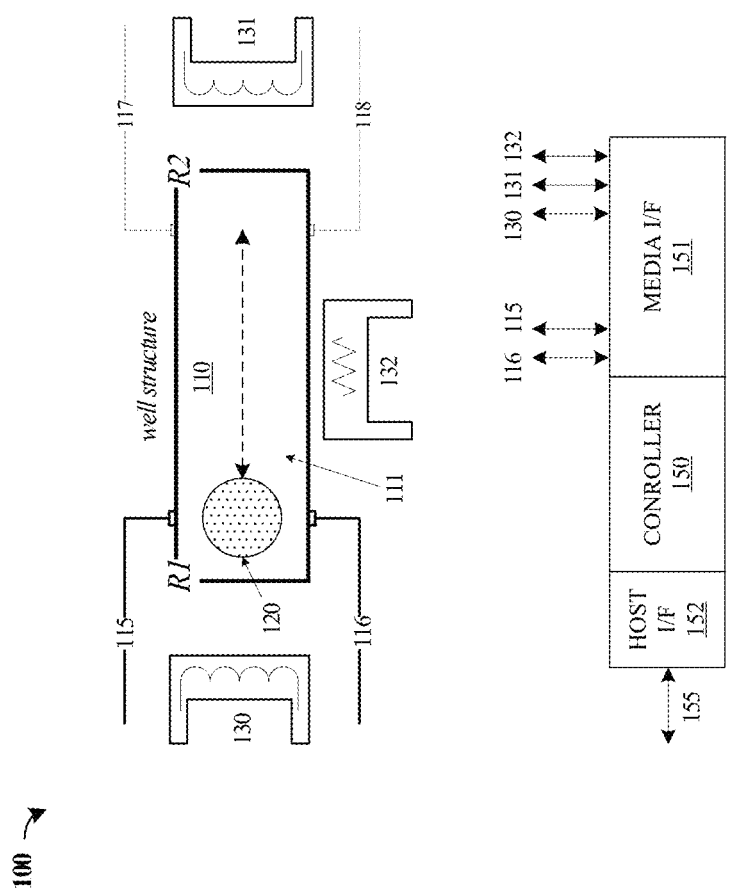
FIG. 1 illustrates an example well structure having an embedded magnetic particle, in accordance with certain embodiments of the present disclosure.

FIG. 1 illustrates system 100 which can include well structure 110 comprising suspension medium 111 with embedded magnetic particle 120. Well structure 110 may be electrically or conductively coupled to external circuitry over links 115-116, such as to controller 150 via media interface 151. Well structure 110 may also optionally be electrically or conductively coupled to external circuitry over links 117-118. System 100 also can include various media handling elements 130-132 employed to alter the physical configuration of magnetic particle 120 within well structure 110. Controller 150 and media interface 151 may couple over associated control links to elements of system 100 to control and functionally interface such elements. Controller 150 may also include host interface 152 which communicatively couples to a host system or external node over link 155.

Well structure 110 can be employed to store data or represent a data state based on an internal positioning of magnetic particle 120. Magnetic particle 120 might also be referred to as a magnetic nanoparticle (MNP), and thus a memory device can be formed using well structure 110 with magnetic particle 120, along with the associated control circuitry. The term 'particle' used herein may refer to one particle or more than one particle in a single well structure which acts as a single combined particle. More than one particle might be included in a well structure with individual or group control over each of the particles, although for clarity, this example focuses on a single particle (or multiple particles) acting as a single body. This memory device will typically be non-volatile, where the position of magnetic particle 120 does not change with regard to removal of an external power or voltage, nor require short-term periodic data refresh procedures to maintain a data state. Thus, a memory device formed from well structure 110, or an addressable collection of many well structures, can be referred to as a magnetic nanoparticle based non-volatile random-access memory (NVRAM). Various external read or write commands and data can be received and transferred by controller 150 via host interface 152 and over link 155.

The data state held by well structure 110 may correspond to a positioning of magnetic particle 120 within well structure 110, and this positioning can be determined or read out using measurements of electrical properties for well structure 110. Although various electrical properties can be employed, such as resistance, capacitance, inductance, reactance, or impedance, and the like, the examples herein discuss the use of resistance for clarity. FIG. 1 shows resistance states 'R1' and 'R2' as being associated with two different locations or positions of magnetic particle 120 within well structure 110. The resistance can be measured or read out using links 115-116. State R1 (shown in FIG. 1) may have magnetic particle 120 located closer to links 115-116 than state R2. In this example, the resistance of magnetic particle 120 is generally lower than the resistance of well structure 110. Other examples can have a different or opposite configuration. Thus, with the present positioning of magnetic particle 120 with respect to links 115-116, resistance state R1 would correspond to a lower resistance than when magnetic particle 120 is located at the opposing end of well structure 110, corresponding to resistance state R2.

The bulk physical movement or position changing of magnetic particle 120 within well structure 110 can be achieved in various ways, as will be discussed herein. The examples include changing a material state of the well structures, which can include a viscosity, material phase (e.g, solid or liquid), or other material state. One example technique includes changing a viscosity of suspension medium 111 to provide for easier bulk movement of magnetic particle 120 within suspension medium 111 by application of an external field, such as a magnetic field or electric field. Other example techniques include changing the material phase or state of suspension medium 111, such as changing from solid to liquid states or phases. Changing of the material state can be achieved by a heating of suspension medium 111 using various techniques. Other examples include selecting a viscosity of suspension medium 111 and having similar densities among suspension medium 111 and magnetic particle 120 such that bulk movement of magnetic particle 120 is achieved by application of an external field without changing the viscosity or other material state of suspension medium 111, and unwanted bulk movement is restricted by this density similarity when the field is not applied. The terms bulk movement or positioning may be employed herein to refer to changes in positioning of magnetic particle 120 from one position state to another within well structure 110 and to distinguish from molecular motion or small-scale oscillations of magnetic particle 120 which arise from random thermal motion or from techniques that actively oscillate magnetic particle 120 within well structure 110 to achieve a heating of well structure 110.

FIG. 1 shows a binary or two-state position within well structure 110 for magnetic particle 120, with each state able to represent a binary logic level or data state. Although a binary or two-state positioning is shown in FIG. 1, it should be understood that any position within well structure 110 can correspond to a different data state, or to an encoded data state based on many discrete positions, an analog/linear representation of position, or multi-dimensional positioning of magnetic particle 120 within well structure 110. For example, a well structure might support a one-dimensional, two-dimensional, or three-dimensional positioning of a magnetic particle therein, and the readout process can include determining a position of the magnetic particle with a resistance measurement across the corresponding well structure, which can further include a multi-point resistance measurement. Examples of such multi-dimensional measurements and positioning are discussed below in FIG. 7. In addition, measurements other than resistance might be employed to determine a position of a magnetic particle within a well structure, such as an optical measurement, capacitance measurement, inductance measurement, impedance measurement, or measured changes in various interfacing signals or control signal characteristics including phase, frequency, or timing.

Well structure 110 may comprise suspension medium 111. Suspension medium 111 can comprise various materials, substances, solutions, and compositions, such as a polymer matrix formed from organic polymer materials. Example materials include various wax compounds or polystyrene, ionic gels having engineered melting points, poly(3,4-ethylenedioxythiophene) polystyrene sulfonate (PEDOT:PSS), among other polymer materials having temperature-dependent viscosities. Other materials may include metals or metal compounds having relatively low melting points, such as lead, gold, bismuth, and the like. Various material properties of suspension medium 111 can be selected to provide functionality as described herein. As mentioned, various wax compounds and wax materials can be suitable, such as when wax materials have low melting points and suitably low latent heat. Example wax materials can include paraffin wax, with melting point around 80 C and latent heat about 200 J/g.

In one example, suspension medium 111 can have an alterable material state, such as an alterable material phase from solid to liquid or alterable viscosity, based on temperature. An alterable viscosity can comprise a thermal deflection point or alterable thermal deflection property. When thermal energy is applied to suspension medium 111 to approach the thermal deflection point, the viscosity of suspension medium 111 may exhibit a state change into a lower viscosity state from an initial higher viscosity state. Responsive to the reduction in viscosity, a positioning of magnetic particle 120 within well structure 110 can be altered due in part to the increased mobility of magnetic particle 120 under the reduced viscosity. When the viscosity is higher, such as in the initial viscosity state or an unheated state, unwanted bulk movement of magnetic particle 120 within well structure 110 may be restricted or prevented.

Other example material properties include a density of suspension medium 111, which may include a fixed density or alterable density. The density might be selected to be within a threshold range of the density of magnetic particle 120, providing for a similar density to that of magnetic particle 120. Also, a viscosity of suspension medium 111 can be selected to provide mobility of magnetic particle 120 without needing to be thermally altered as in the prior example. Thus, bulk movement of magnetic particle 120 within well structure 110 can be achieved based on the compatible viscosity and similar density between suspension medium 111 and magnetic particle 120 regardless of a thermal state of suspension medium 111. Unwanted bulk movement of magnetic particle 120 can be restricted by this density similarity when the field is not applied. Yet other examples might combine techniques of having alterable viscosity and similar density between suspension medium 111 and magnetic particle 120, at least during bulk movement periods. In even further examples, materials can be selected that change viscosity properties based on thermal excitation, such as chalcogenide glass. In chalcogenide glass examples, a controlled heating or cooling can change between amorphous and crystalline states, which may provide for controllable bulk movement of magnetic particles embedded therein. Further examples, include materials that change from a solid phase to a liquid phase, referred to as a material phase change, upon application of thermal energy. This material phase change can relate to a viscosity change.

Magnetic particle 120 comprises microscopic beads or a collection of particles forming a collectively movable node within well structure 110. Magnetic particle 120 can have any size from several nanometers to several micrometers. In some examples, magnetic particle 120 can comprise a magnetic nanoparticle (MNP), although exact sizing and scale can vary based on application. Example materials for magnetic particle 120 include ferromagnetic magnetic materials, such as iron oxide, iron nitride with gold coating, iron, nickel, cobalt, or various materials, alloys, or mixtures of materials including neodymium-iron-boron and samarium-cobalt. While ferromagnetic materials are typically employed, the techniques and structures herein are not limited to ferromagnetic materials, and can be instead comprise superparamagnetic, paramagnetic, or diamagnetic particles. Magnetic particle 120 can be coated with surface treatment materials to prevent disaggregation or dissolution into well structure 110, reduce the formation of oxides (when un-oxidized materials used), or to prevent chemical interactions with surrounding materials forming well structure 110. These surface treatments can include silicates, silicon, polymers, oxides, or carbon materials, among other materials.

Controller 150 is representative of any circuitry, programmable logic, logic circuits, software, firmware, or some combination of elements that manage read/write operations and interface with physical media elements comprising well structure 110, magnetic particle 120, and media handling elements 130-132. Controller 150 can comprise one or more microprocessors and other processing circuitry that retrieves and executes software, such as control software, operating systems, and user interfaces from an associated storage system. Controller 150 can be implemented within a single processing device but can also be distributed across multiple processing devices or sub-systems that cooperate in executing program instructions. Examples of controller 150 include general purpose central processing units, application specific integrated circuits (ASICs), and logic devices, field-programmable gate arrays (FPGAs), as well as any other type of processing device, combinations, or variations thereof. Controller 150 also includes host interface 152 which can include communication interfaces, network interfaces, user interfaces, and other elements for communicating with a host system or other external node over communication link 155.

Controller 150 includes media interface 151 and various controller portions to control memory devices comprising memory cells or memory arrays. Control signaling of controller 150, by way of media interface 151, can include bitlines and wordlines which are used to address memory cells of a memory array to read or write data into magnetic particle-based memory devices. Read operations can include measuring resistance properties of well structures housing magnetic particles. In memory arrays of well structures, media interface 151 can be communicatively coupled to ends of wordlines of the memory arrays and measure series resistances of each of the wordlines. Media interface 151 can also be communicatively coupled to bitlines of the memory arrays and individually select bitlines to measure resistances of a subset of a memory array as a series resistance through a selected bitline and a selected wordline. Other techniques can be employed to measure and read data. Controller 150 can optionally include data processing elements to further process data, such as to arrange data into logical arrangements including words, pages, and the like, before transfer to an external node over link 155. Controller 150 can also be configured to perform encoding/decoding or encryption/decryption operations with respect to the data stored in a memory array. Media interface 151 can also include row decoder circuitry, column decoder circuitry, sense circuitry, sense amplifiers, comparators, level shifters, as well as various other support circuitry.

Figure 2:
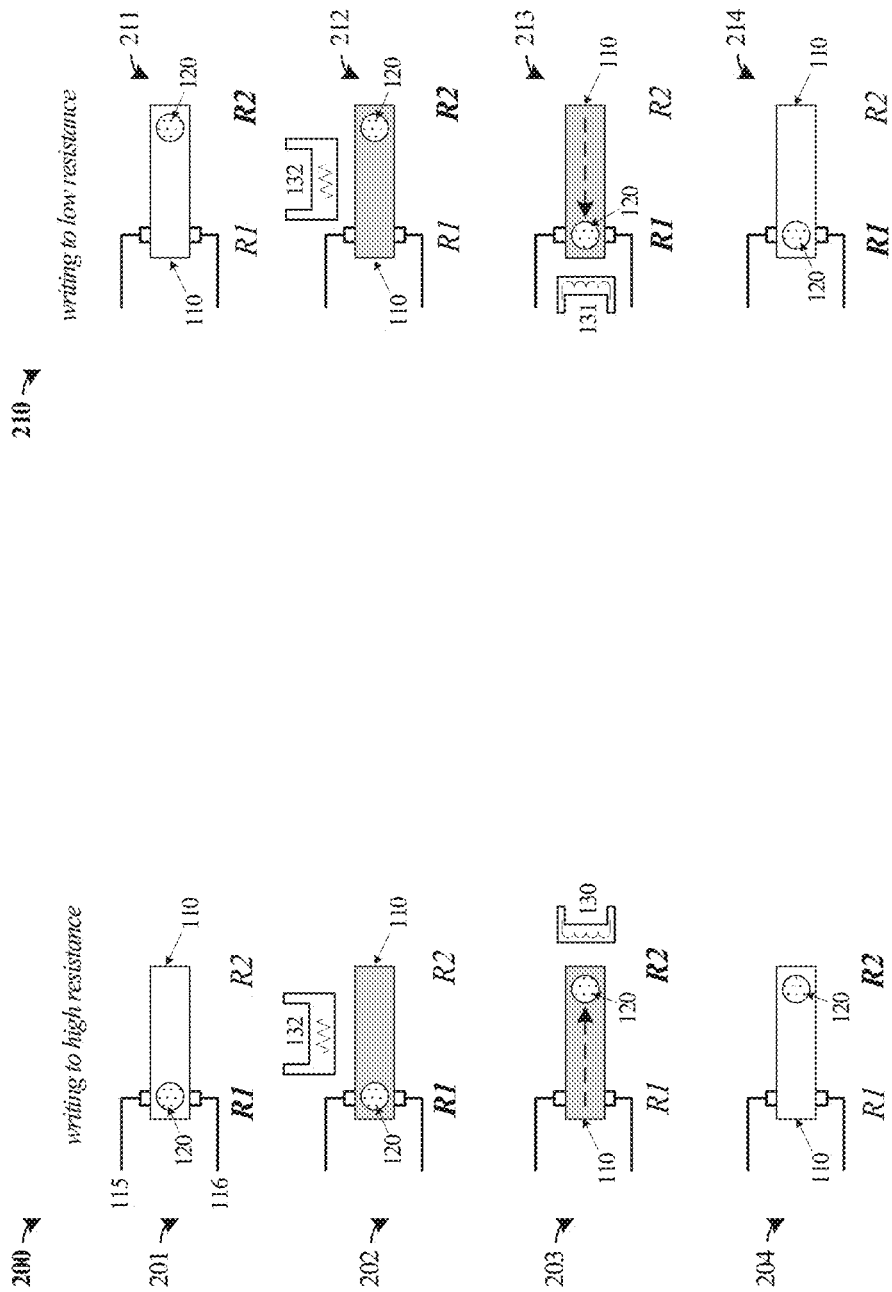
FIG. 2 illustrates example operations altering a configuration of a magnetic particle suspended in a well structure, in accordance with certain embodiments of the present disclosure.

Turning now to a discussion on example operations of system 100, FIG. 2 is provided. FIG. 2 includes two example data "write" operations, namely example 200 illustrating a write from resistance state R1 to R2, and example 210 illustrating a write from resistance state R2 to R1. The write operations correspond to changing a positioning of magnetic particle 120 within well structure 110, which contains suspension medium 111. Due to the positioning of links 115-116 with respect to the geometry of well structure 110, resistance state R1 will typically correspond to a lower resistance value than resistance state R2. A data state might be encoded by this resistance value, such as a binary '0' corresponding to resistance state R1 and a binary '1' corresponding to resistance state R2, or vice versa. Depending on the geometry or size of well structure 110, as well as achievable precision in the positioning and detection of magnetic particle 120, more than two resistance states or data states can be provided, as will be discussed in FIG. 7.

In operation 201, an initial state includes magnetic particle 120 in a position corresponding to resistance state R1. Operation 202 includes changing a material state of suspension medium 111 in well structure 110. To change the material state, a heating operation is performed, such as running electrical current through well structure 110 or using a discrete heating element 132. While a discrete heating element, such as a resistive heating element or ohmic heater, can be employed, heating element 132 is representative of any compatible heating process to increase a temperature of well structure 110 and alter a material state of suspension medium 111. Example heating processes include resistive heating of well structure 110 by applying a write current over links 115-116. Since well structure 110 has a resistive property, an electrical current passed therethrough can increase a temperature of well structure 110. Other examples include a high frequency oscillation or oscillatory movement of magnetic particle 120 (with or without bulk movement to change a bulk position of magnetic particle 120), which adds heat to suspension medium 111 via oscillatory friction. The oscillation of magnetic particle 120 can be achieved via an applied magnetic or electric field, such as via field element 130 or 131. Yet other heating element examples include laser-based heating elements, such as employed in heat-assisted magnetic recording (HAMR) heating techniques. Additionally, radio frequency heating elements can be employed, such as employed in microwave-assisted magnetic recording (MAMR) techniques. Other well structure heating techniques and elements can be employed, along with associated control and power circuitry.

Once a target material state or target temperature has been achieved, then magnetic particle 120 is able to be moved within well structure 110 to another position. Operation 203 illustrates one such change in position. In operation 203, an external field is applied by field element 130 to move magnetic particle 120 into a position corresponding to resistance state R2. Field element 130 might comprise a magnetic field generator, such as electromagnet, inductive coil, voice coil, movable permanent magnet, or other such element. In this example, field element 130 is configured to attract magnetic particle 120. However, it should be understood that a repulsive configuration can instead be employed, having field element 130 positioned on an opposite end of well structure 110. Other configurations are possible, such as a linear motor or accelerator configuration having magnetic particle 120 moved according to a directionality of a field applied to well structure 110 by a corresponding electromagnetic coil or movable permanent magnet. A pulse or other transient effect can be induced in field element 130 to attract, repel, or propagate magnetic particle 120 to a different position in well structure 110.

Once magnetic particle 120 has been moved to the desired position in well structure 110, the write process is completed. Operation 204 shows a completed write process, having magnetic particle 120 in a position corresponding to resistance state R2. A read operation can be performed using links 115-116 to measure a resistance of well structure 110. This resistance corresponds to the position of magnetic particle 120 and to the R2 data state encoded within well structure 110 by magnetic particle 120.

Turning now to example 210, a different write operation is illustrated. In operation 211, an initial state includes magnetic particle 120 in a position corresponding to resistance state R2. Operation 212 includes changing a material state of suspension medium 111 in well structure 110. To change the material state, a heating operation is performed, such as using heating element 132, or other techniques discussed above in operation 202. Once a target material state or target temperature has been achieved, then magnetic particle 120 is able to be moved within well structure 110 to another position. Operation 213 illustrates one such change in position. In operation 213, an external field is applied by field element 131 to move magnetic particle 120 into a position corresponding to resistance state R1. In this example, field element 131 is configured to attract magnetic particle 120. However, it should be understood that a repulsive configuration can instead be employed, having field element 131 positioned on an opposite end of well structure 110. Other configurations are possible, as noted above for operation 203. Once magnetic particle 120 has been moved to the desired position in well structure 110, the write process is completed. Operation 214 shows a completed write process, having magnetic particle 120 in a position corresponding to resistance state R1. A read operation can be performed using links 115-116 to measure a resistance of well structure 110. This resistance corresponds to the position of magnetic particle 120 and to the R1 data state encoded within well structure 110 by magnetic particle 120.

Figure 3:
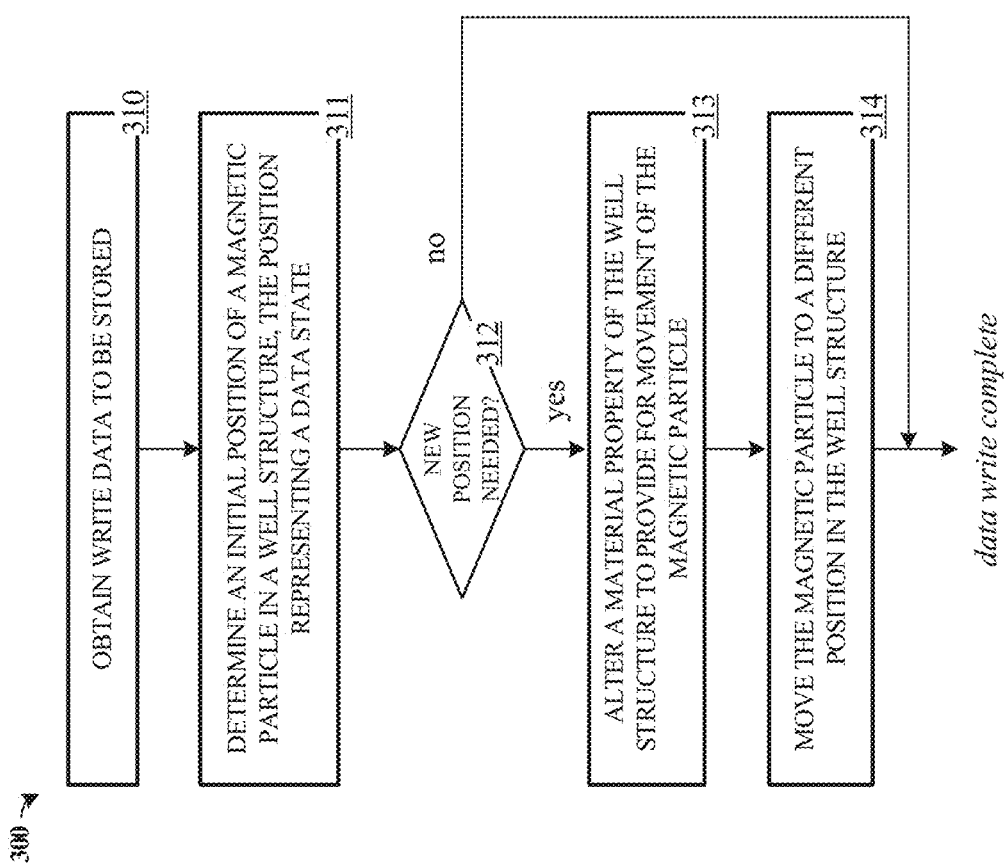
FIG. 3 illustrates example operations altering configurations of magnetic particles suspended in an array of well structures, in accordance with certain embodiments of the present disclosure.

FIG. 3 illustrates further operations 300 for elements found in FIGS. 1 and 2, from the perspective of a data interface. It should be understood that the operations in FIG. 3 can apply to any of the examples herein. In operation 310, controller 150 obtains write data to be stored. This write data can accompany a write command or instruction received over host interface 152 and link 155, such as from a host system, network-coupled device, microprocessor, external node, or other various devices. Controller 150 determines that the write data should be stored in storage element corresponding to well structure 110. A data state is identified to represent the write data, which can be a binary representation corresponding to a position of magnetic particle 120 or resistance state of well structure 110. When arrays of many well structures are employed, various data lengths in excess of one bit can be stored. However, for purposes of this example only a single well structure with a binary state magnetic particle is illustrated. Thus, in operation 311, controller 150 determines an initial position of magnetic particle 120 in well structure 110, the position representing a data state. The position can be determined by measuring the resistance state of well structure 110 over links 115-116 by way of media interface 151. If the current position or resistance state represents the incoming write data (operation 312), then no change in position of magnetic particle 120 is required and the write process can be completed.

However, if a change in position of magnetic particle 120 is needed to represent the incoming write data (operation 312), then controller 150 can proceed to alter the position of magnetic particle 120. In operation 313, controller 150 alters a material property of well structure 110 to provide for movement of magnetic particle 120. In this example, controller 150 instructs media interface 151 to apply an electrical current through links 115-116 to increase a temperature with $I^2R$ current (ohmic heating) of well structure 110. Other examples may employ a discrete heating element 132 or oscillatory heating, as discussed herein. Once a target material state or temperature has been reached for well structure 110, then magnetic particle 120 have be moved to a different position within well structure 110. The target material state or target temperature can be determined in various ways. For example, a predetermined amount or time, current, or energy can be measured for application of the electrical current through links 115-116 to ensure the target material state or target temperature has been met or exceeded. Other examples may include temperature sensing elements, such as thermocouples, which can sense when well structure 110 has achieved the target material state or target temperature. Other techniques than temperature can be employed to determine a present material state, such as optical property measurement or electrical property measurement (e.g., resistance, capacitance, or inductance, and the like) of well structures. In yet other examples, a cyclic heating and measuring process can occur, where heating current is applied to links 115-116 followed by a resistance measurement to determine a present material state or temperature, or dissimilar metals can be employed for links 115-116 or other links to act as thermocouple elements for well structure 110.

Regardless of the technique employed, once the target material state or target temperature has been reached, operation 314 includes controller 150 directing movement of magnetic particle 120 to a different position in well structure 110. When field elements 130-131 are employed, a particular field element can be selected to attract or repel magnetic particle 120. Two or more field elements can be concurrently activated to attract or repel magnetic particle 120, such as when more precision control of position is desired or a multi-dimensional positioning is desired within a well structure. Once magnetic particle 120 has been moved to the new position within well structure 110, the data write process can be considered completed. However, if rapid cycling of data storage or data writes are desired, or an array of well structures is to be written subsequently, then a cool-down period of well structure 110 might be employed to prevent unwanted movement of magnetic particle 120. To verify the data write was successful, a read operation can be performed over links 115-116 to measure a present resistance of well structure 110. The read operation may occur after the aforementioned cool-down period or can be adjusted to compensate for temperature of well structure 110.

Other example read operations can include using more than two connections to well structure 110. FIG. 1 illustrates this with optional links 117-118. Links 117-118 can be used in various differential pairs, differential combinations, or other permutations with links 115-116 to increase a signal-to-noise ratio (SNR) of electrical measurements of well structure 110, such as by using differential measurements or sequential measurements.

Figure 4A:
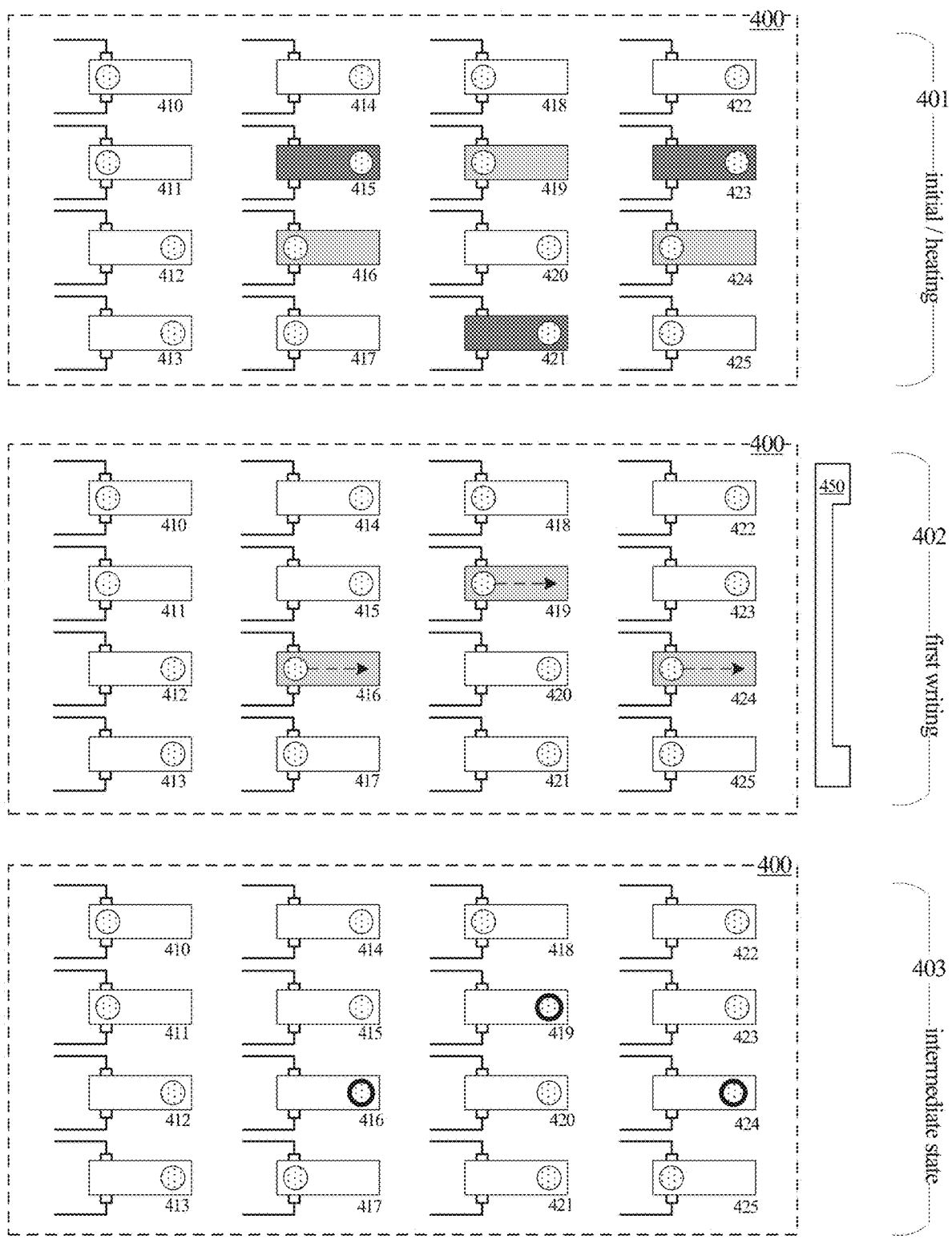
FIG. 4A illustrates example well structure operations, in accordance with certain embodiments of the present disclosure.
Figure 4B:
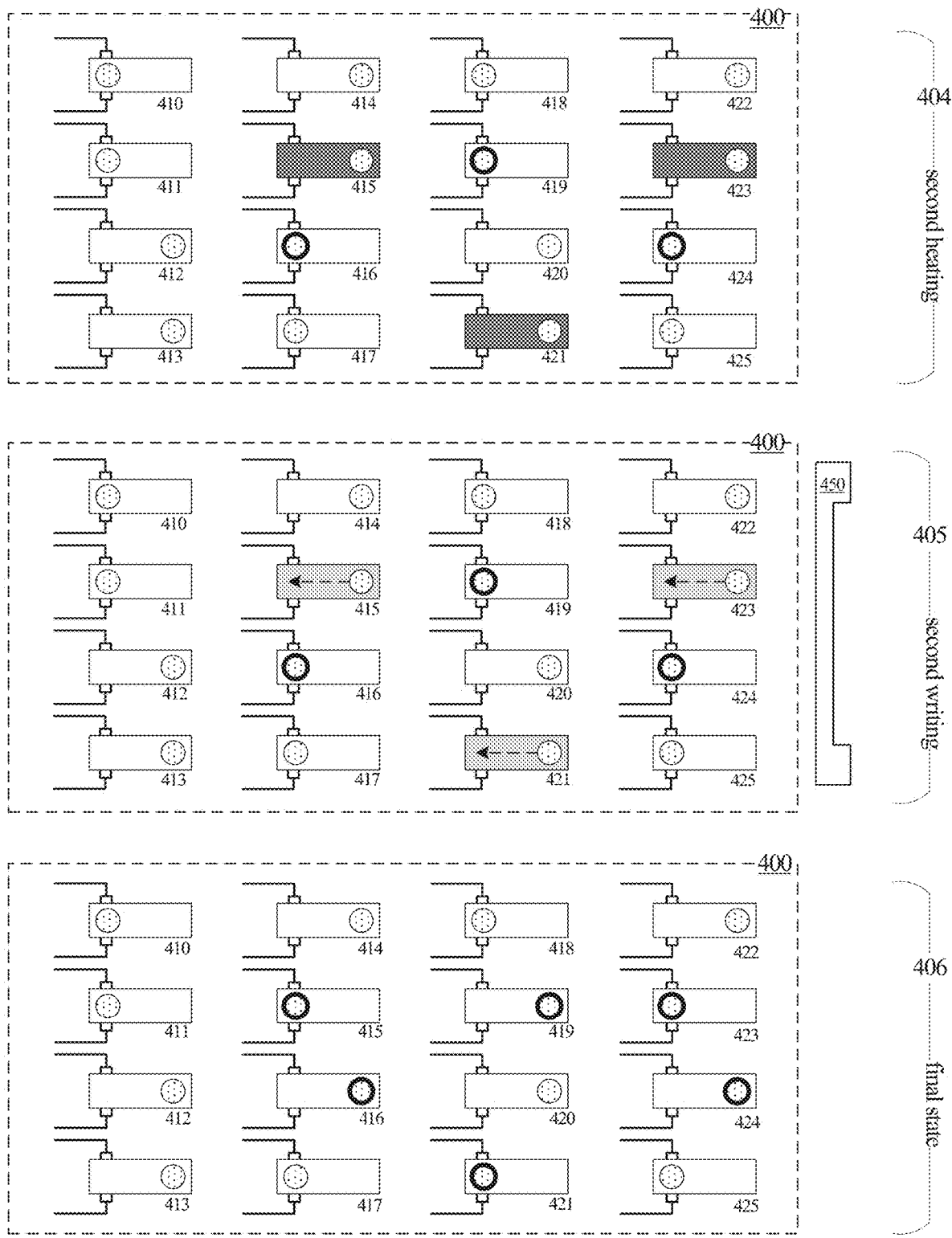
FIG. 4B illustrates example well structure operations, in accordance with certain embodiments of the present disclosure.
Figure 5:
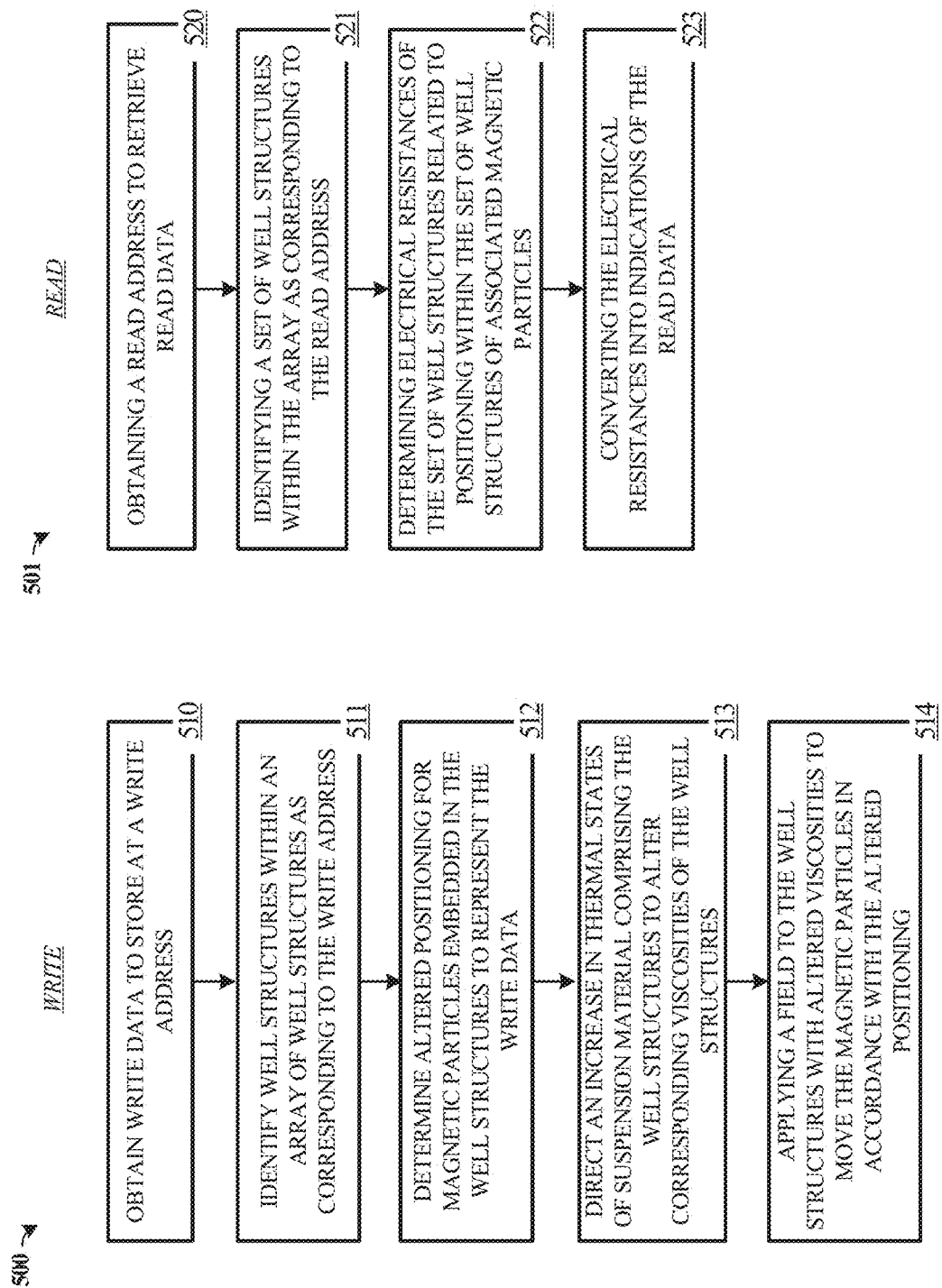
FIG. 5 illustrates example operations altering configurations of magnetic particles suspended in an array of well structures, in accordance with certain embodiments of the present disclosure.
Figure 6:
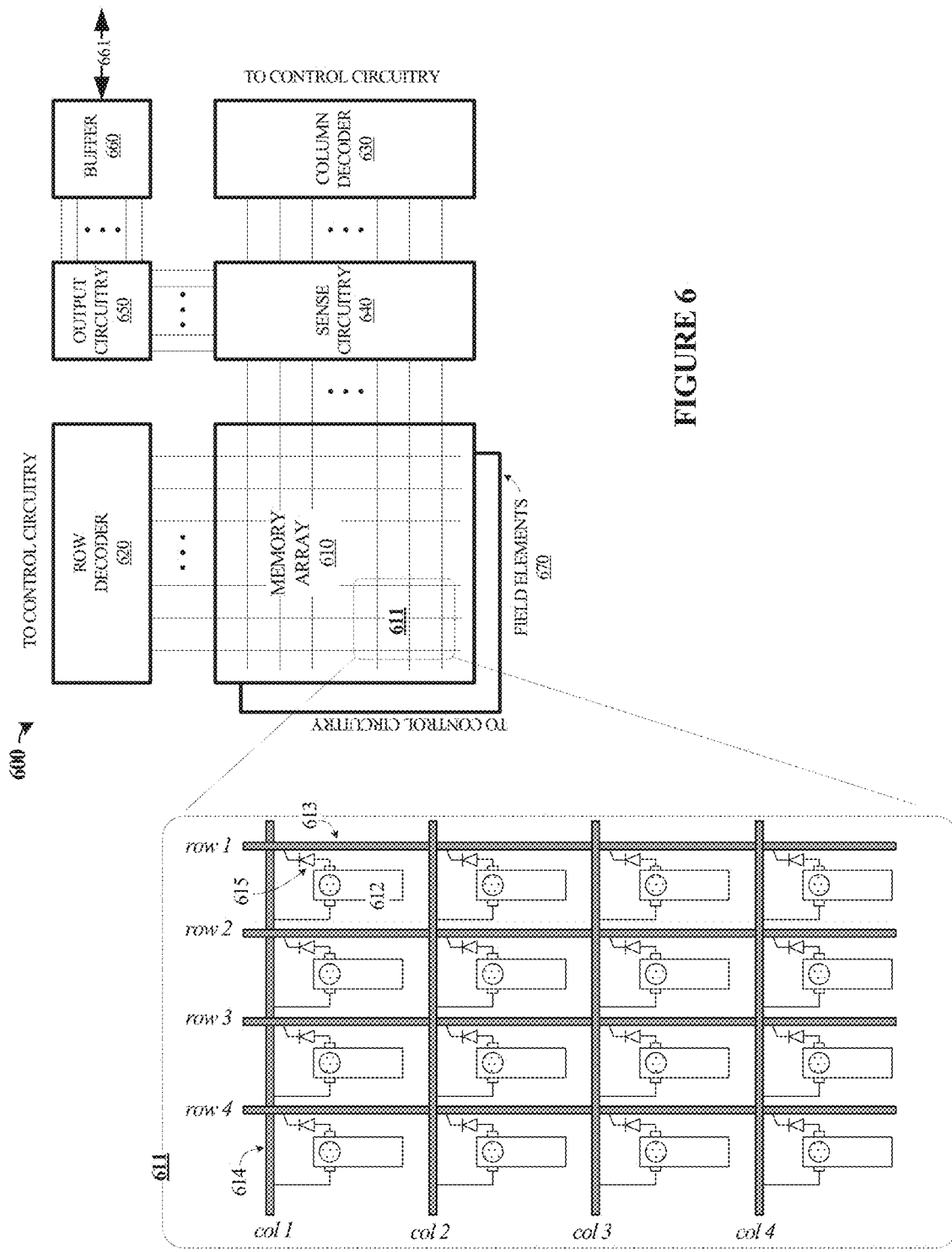
FIG. 6 illustrates an example array of well structures having embedded magnetic particles, in accordance with certain embodiments of the present disclosure.

Turning now to several examples of arrays of more than one well structure, FIGS. 4-6 are presented. FIGS. 4A and 4B illustrate a technique for concurrent writing of selected well structures of an array, while leaving other well structures unchanged or undisturbed. In particular, FIGS. 4A and 4B include memory array 400 in six operational views 401-406. Each view corresponds to a different step of a write operation. Memory array 400 includes sixteen (16) well structures 410-425. Well structures 410-425 each have a corresponding embedded magnetic particle and control links. View 402 also includes field element 450 representative of any of the field elements discussed herein, and operates in an attraction mode. Although controller circuitry is omitted from FIGS. 4A and 4B for clarity, it should be understood that controllers and media interfaces can be included, such as seen in FIG. 1.

FIGS. 4A and 4B illustrate a two-phase write operation. This two-phase operation is employed to write data states into well structures, with first well structures 415, 419, and 424 in a first initial state and second well structures 415, 421, and 423 in a second initial state. Due to the application of an external magnetic field by field element 450, the two-phase operation is employed to move some magnetic particles right and others left, from the perspective illustrated in FIGS. 4A and 4B. Selective heating of only certain well structures can lead to lower power consumption for arrays of well structures.

In a first phase encompassing operational views 401-403, FIG. 4A will be discussed. In operational view 401, an initial state of well structures 410-425 is shown, each well structure having a corresponding positioning of a magnetic particle therein. The positioning corresponds to presently stored data states in the well structures, such as from a prior write operation. To begin a new write operation, individual well structures are identified which require changes to the positioning of the embedded magnetic particles. In FIGS. 4A and 4B, well structures 415, 416, 419, 421, 423, and 424 are highlighted as being identified for changes in positioning of the embedded magnetic particles. While other well structures might be identified by a write address as included in a particular data state, such as for data states represented by multi-bit values, the present positioning of the embedded magnetic particles in those other well structures might not require changing to represent the data state. In preparation for the write process, first selected well structures 416, 419, and 424 are heated (via associated control links) to alter a material state, such as to reduce a viscosity, of suspension material that comprises the well structures. Once a target material state has been achieved, such as a thermal deflection point is reached, or a target viscosity, then well structures 416, 419, and 424 are ready to have the corresponding magnetic particles moved. The remaining other well structures are unheated in this step.

In operational view 402, field element 450 applies an attractive magnetic field to memory array 400. Due to the material state change, such as lowered viscosity, of well structures 416, 419, and 424, the embedded magnetic particles for those well structures can move to the opposing end of those well structures. Specifically, well structures 416, 419, and 424 have magnetic particles that support bulk movement to a different end of the respective well structures, while the other magnetic particles do not move. At this point, a first portion of the data state has been written into memory array 400, and operational view 403 shows an intermediate state of memory array 400. Well structures 416, 419, and 424 can be allowed to cool before moving on to a next step.

In a second phase encompassing operational views 404-406, FIG. 4B will be discussed. In operational view 404, an intermediate state of well structures 410-425 is shown, each well structure having a corresponding positioning of a magnetic particle therein. In preparation for the second write process, second selected well structures 415, 421, and 423 are heated (via associated control links) to alter a material state, such as to reduce a viscosity, of suspension material that comprises the well structures. Once target material state has been achieved, such as a thermal deflection point is reached, or a target viscosity, then well structures 415, 421, and 423 are ready to have the corresponding magnetic particles moved. The remaining other well structures are unheated in this step.

In operational view 405, field element 450 applies a repulsive magnetic field to memory array 400. Due to the altered material state of well structures 415, 421, and 423, the embedded magnetic particles for those well structures can move to the opposing end of those well structures. Specifically, well structures 415, 421, and 423 have magnetic particles that support bulk movement to a different end of the respective well structures, while the other magnetic particles do not move. At this point, a second portion of the data state has been written into memory array 400, and operational view 406 shows a final state of memory array 400.

Although one example process for writing data states into well structures having different initial states is shown in FIGS. 4A and 4B, other techniques can be employed. One example technique includes performing an erase operation prior to a write operation. This erase operation can heat all well structures for a given region associated with a write address, which may include larger regions than the write address when blocks or pages are employed for a chosen access granularity. The erase operation can place the magnetic particles into the same position for all heated well structures. Then, the well structures are allowed to cool to reduce the corresponding viscosities. Next, a write operation can heat only well structures that need state changes for magnetic particles, followed by an attractive or repulsive field application for those well structures. Also, selective use of repulsive or attractive fields can be chosen based on the desired write techniques and availability of circuitry and field elements to support either repulsive or attractive operations. For example, only repulsive or only attractive fields might be applied, and write processes can be adjusted accordingly.

FIG. 5 illustrates further operations 500 and 501 for elements found in FIGS. 4A and 4B, from the perspective of an externally-facing interface, such as host interface 152 of FIG. 1. Thus, for purposes of illustration, links corresponding to well structures 410-425 can be coupled to media interface 151, links corresponding to field element 450 can be coupled to media interface 151, and host or external communications can be handled by host interface 152 over link 155. Associated control operations can also be handled by controller 150. It should be understood that the operations in FIG. 5 can apply to any of the examples herein and are not limited to those implementations found in FIG. 1. In FIG. 5, operations 500 reflect a write operation, and operations 501 reflect a read operation.

Turning first to a write operation, operation 510 includes host interface 152 obtaining write data to store at a write address. The write data can be accompanied by the write address in various transfer formats, such as data packets, frames, and other datagrams. In some instances, the write address can conform to a host formatting or host address scheme, while controller 150 can translate between the host address scheme and a physical storage or media-level address scheme, which may include provisions for well structure addressable sets, control lines (such as bitlines or wordlines), wear-leveling, or other media-specific handling attributes. The write data may be of a bit length supported by the datagram as well as the addressing scheme, which may indicate data blocks, logical blocks, file identifiers, content identifiers, or other addressing schemes.

In operation 511, controller 150 identifies a "write set" of well structures within memory array 400 as corresponding to the write address. Typically, an allocation scheme is employed by controller 150 to track which well structures correspond to which data addresses, such as using various data structures or tables. A lookup or translation process can be performed by controller 150 to translate the write address into identifiers for individual well structures to include in the write set. These identifiers can correspond to well structures that are to be overwritten with the write data, or to previously un-written well structures. Regardless of the present state of the well structures, controller 150 determines altered positioning for magnetic particles embedded in the well structures to represent the write data in operation 512. A write process might include an erase process which first places the well structures into a known or initial state before writing the data. In yet other examples, a present state of the well structures can be employed for selective changing of well structure states based on the write data, such that a read operation may occur first to compare to the write data, and only mis-compares are determined to need writing. Desired positioning for embedded magnetic particles is determined for the write set of well structures. In FIGS. 4A and 4B, this positioning corresponds to a binary or two-position state, and thus controller 150 can determine if the present position of the magnetic particles need to be altered into a subsequent position for each of the members of the write set. This subsequent positioning represents data states corresponding to the write data.

Once the write set of well structures corresponding to the write address and the desired positioning of the magnetic particles corresponding to the write data are determined, then a write process can occur to store the write data in the write set of well structures. In operation 513, controller 510 (by way of media interface 511) directs an increase in thermal states of suspension material comprising the write set of well structures to alter corresponding viscosities of the write set of well structures. This increase in thermal states may be directed to only occur for selective ones of the write set of well structures, for example only for ones of the well structures that need be changed from a present state. Since individual well structures can have individual connections, this thermal heating can occur selectively and as-needed for each well structure. While a two-phase write technique can be implemented, such as discussed above for FIGS. 4A and 4B, other write techniques can be employed. Other examples may have various physical groupings of well structures which must be thermally increased concurrently, such as bitline groupings, wordline groupings, page groupings, block groupings, and the like. The increase in thermal states for the selected well structures can be achieved using an electrical current directed over the corresponding well structure links, among other techniques discussed herein. Media interface 151 can include circuitry to handle this increased electrical current and selective application thereof.

Responsive to a target material state achieved in the well structures, such as reaching or exceeding a thermal deflection point of the suspension material, controller 150 then applies an external field to the well structures having the altered viscosities to move the magnetic particles in accordance with the altered positioning. In FIG. 4A, this corresponds to operation 402 having field element 450 activated to apply a magnetic field to attract and move ones of the magnetic particles embedded in well structures with altered material states. Once the field has been applied for a predetermined amount of time required to sufficiently move the magnetic particles into the subsequent positioning, then the field can be deactivated, and the well structures allowed to cool or reduce in thermal state back to an initial material state. The write process concludes at this point, and another write process to the write set may occur for different data, or a two-phase write process can occur for additional data from the same write transaction. A write confirmation can be provided to a host system or external node. Sets of write data associated with different write transactions can be concurrently written to different zones or groupings of well structures. This can be achieved by selective arrangement of well structures and corresponding control or interface links, as well as supporting circuitry included in media interface 151. In this manner, many parallel writes can be handled by a single storage device to different storage locations.

Turning now to read operations 501, data previously written into various well structures can be read out and provided to an external node or host system. In operation 520, host interface 152 obtains a read request accompanied by a read address or other indicator of read data, such as a filename or content name. The read request can be accompanied by the read address in various transfer formats, such as data packets, frames, and other datagrams. In some instances, the read address can conform to a host formatting or host address scheme, while controller 150 can translate between the host address scheme and a physical storage or media-level address scheme, which may include provisions for well structure addressable sets, control lines (such as bitlines or wordlines), wear-leveling, or other media-specific handling attributes. The amount of read data requested can be of a length supported by the datagram as well as the addressing scheme. The read data can be identified by addressing indicating data blocks, logical blocks, file identifiers, content identifiers, or other identification schemes.

Operation 521 includes identifying a set of well structures within the array as corresponding to the read address. Controller 150 identifies a "read set" of well structures within memory array 400 as corresponding to the read address. Typically, an allocation scheme is employed by controller 150 to track which well structures correspond to which data addresses, such as using various data structures or tables. A lookup or translation process can be performed by controller 150 to translate the read address into identifiers for individual well structures to include in the read set. The read set might span a set of well structures within a particular zone or span various zones, which may or may not comprise contiguous or adjacent well structures.

Once the read set of well structures corresponding to the read address are determined, then a read process can occur to retrieve the read data from the read set of well structures. In operation 522, controller 510 (by way of media interface 511) determines electrical resistances of the set of well structures related to positioning within the set of well structures of associated magnetic particles. The electrical resistances relate to positioning of the magnetic particles within the well structures, and the relation of the magnetic particles to the links that are coupled to the well structures. The closer the magnetic particle is to the link for any given well structure correspond to a lower resistance value, and vice versa. Thus, based on the measured electrical resistances, controller 510 converts (operation 523) the electrical resistances into indications of the read data. The read data is represented by encoded data or data states that use the positioning of the magnetic particles and corresponding well structure resistances. A translation between these measurements and the corresponding data bits can occur, which may include various tables, binary levels, or multi-level representations of data, encoded data, or multi-bit data including redundancy bits. The translations include translating electrical resistances for each well structure to a data state. Calibration or adjustments to the low/high electrical resistance values for each well structure can be determined occasionally or upon each read operation. For multi-level resistances, a calibration process can determine electrical resistance for each of a set of desired positions of a magnetic particle within a well structure. Controller 510 then provides the read data to the requesting node over link 155, such as to a host system or external node, which includes formatting the data into a corresponding packet, frame, or logical storage format with associated addressing or bit organization scheme. As mentioned above, a differential measurement using differential pairs of signals can be employed for well structures, which can further increase discrimination of magnetic particle positioning and measurement SNR for multi-position well structures. This differential measurement can include associated calibrations over magnetic particle positioning in multiple spatial dimensions. Moreover, when other electrical properties are employed to measure well structures, various spatial calibrations can include capacitance calibrations, inductance calibrations, optical measurement calibrations, and the like.

FIG. 6 illustrates example system 600 having memory array 610 of well structures having embedded magnetic particles, in accordance with certain embodiments of the present disclosure. System 600 also includes various peripheral circuitry. This peripheral circuitry comprises various control, interface, and sensing circuitry. In FIG. 6, system 600 further includes row decoder circuitry 620, column decoder circuitry 630, sense circuitry 640, output circuitry 650, buffer circuitry 660, and field elements 670. Various communication links and signal lines are shown in FIG. 6, although the specific implementation of these lines can vary. Typically, row and column signal lines will be employed in memory array 610 to form an arrayed memory arrangement. This arrayed memory arrangement comprises a memory cell at each junction of a row and a column. Memory array 610 can thus include 'm' quantity of rows and 'n' quantity of columns, creating an 'm' by 'n' array of well structures each corresponding to an individual memory cell.

FIG. 6 also includes an example memory cell detailed view 611. Detailed view 611 shows a component-level view of a portion of memory array 610, although this view is simplified for clarity. Memory cell 612 is positioned at a physical junction between row line 613 and column line 614. Memory cell 612 comprises a well structure with an embedded magnetic particle. Memory cell 612, along with each of the other memory cells, can have additional diode structures 615 or other circuit elements to prevent sneak currents during read or write operations. Further details on these elements are discussed herein. Each junction of a row and a column of memory array 610 includes a memory cell similar to that shown for memory cell 612. Moreover, various interconnect, metallization, insulators, terminals, and other elements can be included during implementation of memory array 610.

Typically, associated components of detailed view 611 are formed onto an organic or semiconductor substrate using techniques found in semiconductor wafer processing and microfabrication, such as photo-lithography, diffusing, deposition, epitaxial growth, etching, annealing, and ion implanting, among others. In some examples, a layered approach is established having a first set of one or more layers dedicated to memory array 610, with a second set of one or more layers dedicated to control circuitry, such as elements 620, 630, 640, 650, 660, and 661. The layers comprising memory array 610 might comprise a different substrate than that of the control circuitry. For example, memory array 610 might comprise an organic substrate having material suitable for well structure formation and support, such as a vinyl substrate, polymer substrate, indium gallium arsenide (InGaAs), or other substrate. This memory array substrate can be mated or positioned proximate to a second substrate housing the control circuitry, which may comprise a more traditional semiconductor substrate, such as silicon. A further layer might be provided that houses heating elements or field elements, and comprise various metallic materials and magnetic materials. In such layers, an array of miniaturized electromagnets or selectable magnetic control elements can be formed. Interconnect can be provided among the various layers as needed for data exchange, control links, and power transfer. Thus, an integrated circuit device can be provided that has several layers and provides a memory array, control circuitry, and field elements combined into a stacked arrangement.

Memory array 610 is also positioned proximate to field elements 670. Field elements 670 can comprise an array of field elements configured to move magnetic particles of memory array 610. Depending on the implementation, field elements 670 might include many small magnetic field elements positioned proximate to individual well structures or to groups of many well structures. Other examples include a single field element which can affect the entirety of memory array 610. Field elements 670 provide an external field, such as magnetic or electric, which applied by to move magnetic particles into different positions in corresponding well structures. Field elements 670 might comprise magnetic field generators, such as electromagnets, inductive coils, voice coils, permanent magnets, or other such elements. Field elements 670 can provide attractive or repulsive modes of operation with respect to magnetic particles. Field elements 670 are coupled to control circuitry for various control, power, triggering, monitoring, and selective application operations thereof.

Row decoder 620 and column decoder 630 will typically be coupled to control circuitry which is configured to control read operations and well heating operations during writes, among other operations. Row decoder 620 and column decoder 630 each comprise line selection circuitry and logic to enable/disable particular rows and columns of memory array 610 as directed by control circuitry. Line selection circuitry can comprise selection transistors, buffers, inverters, current limiter circuitry, transmission gates, and other similar circuitry. In this manner, individual memory cells in memory array 610 can be read, written, or erased when combined with field elements 670 that move the corresponding magnetic particles. Diodes, such as seen for element 615 for memory cell 612, can be included on a row terminal of each memory cell to prevent sneak currents during read or write operations. Other structures can achieve a similar function to element 615, such as transmission gates or transistor selectors. The diode structure can be included on a column terminal in other examples.

During write operations, write transactions can be received over link 661 which indicates a write address. Based on the write address, selective ones of the memory cells of memory array 610 can have corresponding magnetic particles moved from initial positions to subsequent positions within well structures. Field elements 670 achieve movement of the magnetic particles once selected well structures have achieved a target material state, such as a target material phase, target viscosity, or thermal deflection point. The heating of individual or selected memory cells of memory array 610 to achieve the target material state is provided by selective application of sufficient electrical current over individual ones among the row and column connections to the cells.

During read operations, read transactions can be received over link 661 which indicates a read address. Based on the read address, sense circuitry 640 senses resistances of selected memory cells. Sense circuitry 640 can include sense amplifiers, comparators, level shifters, as well as various other support circuitry. Sense circuitry 640 provides representations of the resistances of selected memory cells to output circuitry 650. Output circuitry 650 comprises output circuitry to interpret the resistances into data values, which can include the various operations described herein for controller 150 of FIG. 1. These data values can include binary values having resistance levels corresponding to desired logical representations. Buffer 660 can comprise digital memory elements included to store data bits determined by output circuitry 650 before transfer to one or more external systems over data link 661. In some examples, portions of column decoder 630, sense circuitry 640, output circuitry 650, and buffer 660 can be combined into circuitry blocks or shared over similar circuitry components.

Figure 7:
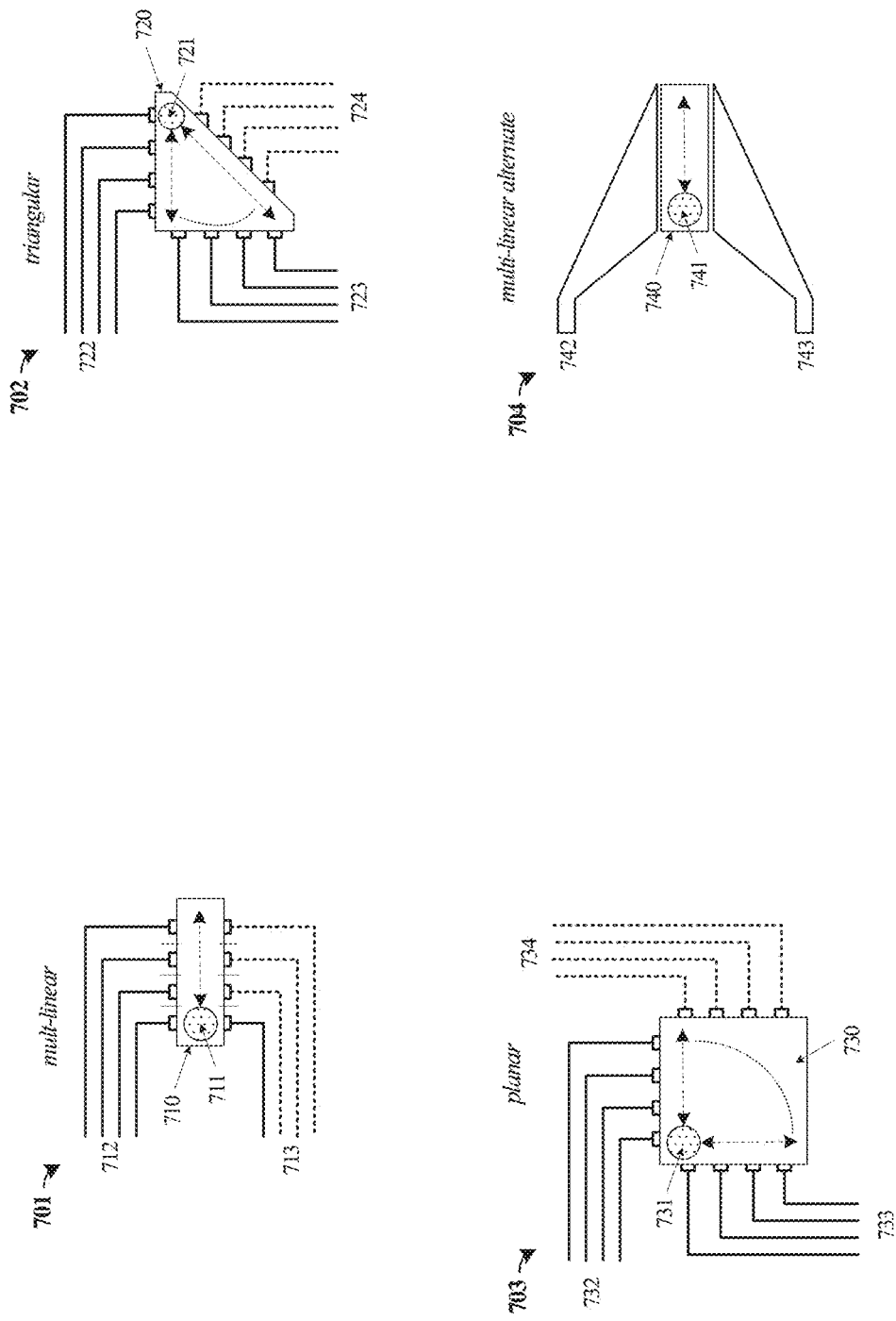
FIG. 7 illustrates example alternate configurations of well structures having embedded magnetic particles, in accordance with certain embodiments of the present disclosure.

FIG. 7 illustrates example alternate configurations having magnetic particles embedded in multi-position or multi-dimensional well structures, in accordance with certain embodiments of the present disclosure. Example 701 illustrates a multi-linear well structure configuration. Example 702 illustrates a triangular well structure configuration. Example 703 illustrates a planar well structure configuration. Example 704 illustrates an alternate multi-linear well structure configuration. Peripheral circuitry, such as controllers, thermal elements, field elements, and other related elements are omitted from FIG. 7 for clarity. The examples in FIG. 7 can be included in any of the control schemes or array structures discussed herein, with additional control links employed for the various dimensional control of embedded magnetic particles.

In example 701, a multi-linear configuration is shown. This multi-linear configuration has four links 712 arranged along a first longitudinal side of well structure 710 which has embedded magnetic particle 711. One or more links 713 are arranged along a second longitudinal side of well structure 710. In example 701, magnetic particle 711 can take more than one position along the longitudinal length of well structure 710. This more than one position can relate to a data state encoded by the position, such as in a multi-level encoding scheme. The quantity of positions corresponds to the quantity of bits which can be encoded by the position of the magnetic particle when written, and likewise the resistance value of the well structure when read. Thus, a three, four, or more position configuration can be achieved depending on the length of well structure 710 and the precision in positioning for magnetic particle 711. External field elements can provide for this precision on positioning for magnetic particle 711. As shown in example 701, four 'upper' links are coupled to well structure 710 to provide for at least four resistance readings. While four companion links can be positioned on the opposite side of well structure 710 to provide for these resistance readings, it should be understood that only one such link might be employed to provide for adequate resolution in resistance measurements to determine the data state encoded by well structure 710.

In yet other examples, pairs of links among links 712-713 can be employed to provide selective heating of only a portion of well structure 710, with that portion proximate to the corresponding link pair. Thus, only a portion of well structure 710 might have a material state altered to allow magnetic particle 711 to move only within a narrow band or section of well structure 710 associated with that pair of links. In this manner, a bulk or crude field can be applied to achieve a precision positioning and associated data state encoded by selectively heating only a slice or portion of well structure 710 using a pair (or multiple pairs) of links, leaving some links un-energized. The portion of well structure 710 that is proximate to the un-energized links can remain below a threshold level with respect to a material state or temperature and prevent or restrict movement of magnetic particle 711 under the influence of an external field.

In example 702, a triangular configuration is shown. This triangular configuration can provide a multi-axis planar movement for magnetic particle 721 within well structure 720. Links 722 are positioned along a first edge of well structure 720, and links 723 are positioned along a second edge of well structure 720. Optional links 724 are positioned along a third edge of well structure 720. In operation, magnetic particle can be selectively positioned in a two-dimensional manner within well structure 720, such that a position encodes a data state during a write process. A read process can measure a resistance of well structure 720 to determine the data state presently encoded by magnetic particle 721. When more than one axis or dimension is employed for positioning of magnetic particle 721, a resistance measurement might include a multi-dimensional measurement for a multi-level resistance state. This can include taking multiple resistance measurements from multiple ones among links 722-724 to discriminate the positioning of magnetic particle in two-dimensions.

As with example 701, a modified write process can include using selected pairs among links 722-724 to only heat a portion of well structure 720 to provide limited movement of magnetic particle 721 within only that portion of well structure 720. In this manner, precision positioning of magnetic particle 721 within well structure 720 can be achieved using a bulk external field. A staggered or sequential heating of slices or portions of well structure 720 can be provided using sequential pairs of links 722-724 to incrementally step the positioning of magnetic particle 721 within well structure 720. Other examples may include usage of a precision external field, such as using a magnetic read/write head element, voice coil element, or other such elements to precisely move magnetic particle 721 in two dimensions within well structure 720 which has been fully heated to have an altered material state, such as a reduced viscosity or altered phase from solid to liquid.

In example 703, a planar configuration is shown, which may comprise a rectangular, hexagonal, square, or other polygonal shape. This planar configuration can provide a multi-axis planar movement for magnetic particle 731 within well structure 730. Links 732 are positioned along a first edge of well structure 730, and links 733 are positioned along a second edge of well structure 730. Optional links 734 are positioned along a third edge of well structure 730. In operation, magnetic particle can be selectively positioned in a two-dimensional manner within well structure 730, such that a position encodes a data state during a write process. A read process can measure a resistance of well structure 730 to determine the data state presently encoded by magnetic particle 731. When more than one axis or dimension is employed for positioning of magnetic particle 731, a resistance measurement might include a multi-dimensional measurement. This can include taking multiple resistance measurements from multiple ones among links 732-734 to discriminate the positioning of magnetic particle in two-dimensions.

As with examples 701-702, a modified write process can include using selected pairs among links 732-734 to only heat a portion of well structure 730 to provide limited movement of magnetic particle 731 within only that portion of well structure 730. In this manner, precision positioning of magnetic particle 731 within well structure 730 can be achieved using a bulk external field. A staggered or sequential heating of slices or portions of well structure 730 can be provided using sequential pairs of links 732-734 to incrementally step the positioning of magnetic particle 731 within well structure 730. Other examples may include usage of a precision external field, such as using a magnetic read/write head element, voice coil element, or other such elements to precisely move magnetic particle 731 in two dimensions within well structure 730 which has been fully heated to have an altered material state, such as a reduced viscosity or altered phase from solid to liquid.

In example 704, an alternate linear configuration is shown. This alternate multi-linear configuration has webbed link 742 arranged along the entire first longitudinal side of well structure 740 which has embedded magnetic particle 741. Webbed Link 743 is arranged along the entire second longitudinal side of well structure 740. In example 704, magnetic particle 741 can have two positions along the longitudinal length of well structure 740, which relates to a binary data state encoded by the resistance value of well structure 740. However, due to the shape and arrangement of links 742-743, a different control scheme can be employed for links 742-743 during reads and writes. In one example, webbed links 742-743 are employed to provide a more even resistive heating of well structure 740. In other examples, read operations can measure resistance using dynamic measurements, such as placing oscillated measurement signals onto links 742-743 or phase-shifted signals to measure the resistance with the larger webbed links 742-743. Alternatively, links 742-743 can be used for well structure heating, while other discrete links (not shown) can be employed for resistance measurement, such as seen in FIG. 1.

Although the examples in FIG. 7 show variations on the well structures and magnetic particle positioning discussed herein, the implementations are not limited to these examples. For instance, a well structure can be formed to support movement of a magnetic particle in any number of dimensions to provide one-dimensional linear positioning, two-dimensional planar positioning, and three-dimensional volumetric positioning (e.g., cubic well structures). More than one magnetic particle might be included or embedded in a well structure. The more than one magnetic particle (i.e., multiple particles) might be configured to act as one overall or bulk particle, or may be configured for individual particle control, when the control circuitry is configured to discriminate and move more than one magnetic particle. This can include using the selective heating techniques mentioned for examples 701-703, or include a single shared well structure that is partitioned to hold many magnetic particles each in a sub-portion with a separate set of control links. Also, different materials might be used for links that couple to well structures, such as differing metals or conductor materials, even along the length of a single well structure. The different metals or conductor materials can be employed to discriminate positioning of the magnetic particle(s) based on different resistance and conductance properties of the materials.

Figure 8:
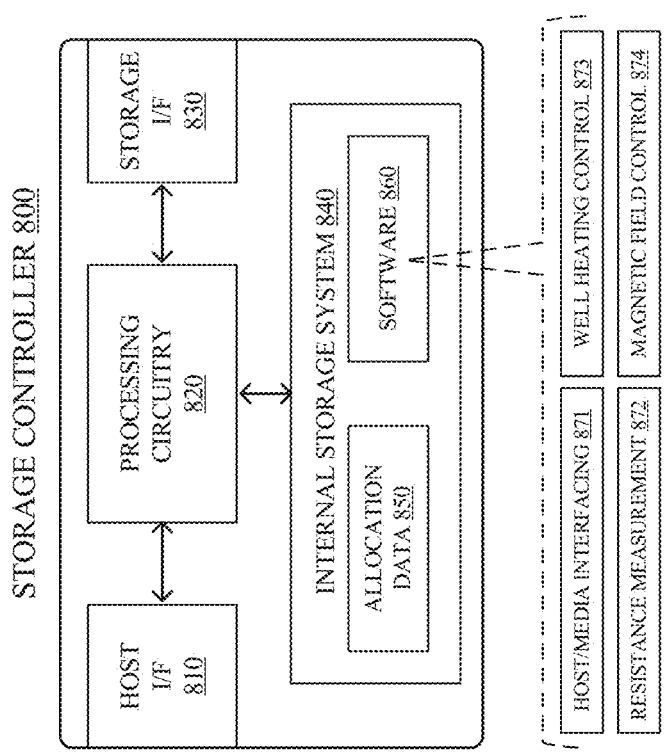
FIG. 8 is s block diagram illustrating a control system, in accordance with certain embodiments of the present disclosure.

FIG. 8 illustrates storage controller 800. Storage controller 800 may take on any among a wide variety of configurations, and can form elements discussed herein for controller 150 of FIG. 1. Moreover, storage controller 800 can form elements discussed herein for elements 620, 630, 640, 650, and 660 of FIG. 6, along with any associated interfaces and links. Here, an example configuration is provided for a storage controller implemented as an ASIC or FPGA. However, in other examples, storage controller 800 may be built into a storage device, storage drive, storage system, or storage array, or incorporated into a host system. In yet other examples, portions of storage controller 800 can be implemented in computer-readable instructions, such as those stored on a computer-readable medium for execution by a processor.

Storage controller 800 comprises host interface 810, processing circuitry 820, storage interface 830, and internal storage system 840. Host interface 810 comprises circuitry configured to receive data and commands from external nodes or host systems and to send data to such systems. Storage interface 830 comprises circuitry configured to send data and commands to storage media and to receive data from the storage media.

Processing circuitry 820 comprises electronic circuitry configured to perform the tasks of a storage controller as described herein. Processing circuitry 820 may comprise microprocessors and other circuitry that retrieves and executes software 860. Processing circuitry 820 may be embedded in a storage system in some examples. Examples of processing circuitry 820 include general purpose central processing units, application specific processors, and logic devices, as well as any other type of processing device, combinations, or variations thereof. Processing circuitry 820 can be implemented within a single processing device but can also be distributed across multiple processing devices or sub-systems that cooperate in executing program instructions.

Internal storage system 840 can comprise any computer readable storage media capable of storing software 860 that is executable by processing circuitry 820. Internal storage system 840 can also include various data structures 850 which comprise one or more databases, tables, lists, caches, or other data structures. Internal storage system 840 can include volatile and nonvolatile, removable and non-removable media implemented in any method or technology for storage of information, such as computer readable instructions, data structures, program modules, or other data. Internal storage system 840 can be implemented as a single storage device but can also be implemented across multiple storage devices or sub-systems co-located or distributed relative to each other. Internal storage system 840 can comprise additional elements, such as a controller, capable of communicating with processing circuitry 820. Examples of storage media include random access memory, read only memory, magnetic storage, optical storage, flash memory, virtual memory and non-virtual memory, or any other medium which can be used to store the desired information and that can be accessed by an instruction execution system, as well as any combination or variation thereof.

Software 860 can be implemented in program instructions and among other functions can, when executed by storage controller 800 in general or processing circuitry 820 in particular, direct storage controller 800, or processing circuitry 820, to operate as described herein for a storage controller. Software 860 can include additional processes, programs, or components, such as operating system software, database software, or application software. Software 860 can also comprise firmware or some other form of machine-readable processing instructions executable by elements of processing circuitry 820.

In general, software 860 can, when loaded into processing circuitry 820 and executed, transform processing circuitry 820 overall from a general-purpose computing system into a special-purpose computing system customized to operate as described herein for a storage controller, among other operations. Encoding software 860 on internal storage system 840 can transform the physical structure of internal storage system 840. The specific transformation of the physical structure can depend on various factors in different implementations of this description. Examples of such factors can include, but are not limited to, the technology used to implement the storage media of internal storage system 840 and whether the computer-storage media are characterized as primary or secondary storage.

For example, if the computer-storage media are implemented as semiconductor-based memory, software 860 can transform the physical state of the semiconductor memory when the program is encoded therein. For example, software 860 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

In at least one implementation, software 860 can include host/media interfacing element 871, resistance measurement element 872, well heating control element 873, and magnetic field control element 874.

Host/media interfacing element 871 can interface with a host or external node to obtain write data to store at a write address, obtain read instructions to retrieve read data from a read address. Host/media interfacing element 871 can interwork a host interface having a logical data format or address/allocation scheme into one employed by physical media. Allocation data 850 can be employed to convert or translate the host format into the media format. Allocate data 850 can also be employed to cache write or read transactions and data, and to buffer data in transit or data being written or read. Host/media interfacing element 871 also identifies well structures within an array of well structures as corresponding to write addresses or read addresses. For write operations, host/media interfacing element 871 determines altered positioning for magnetic particles embedded in the well structures to represent the write data. For read operations, host/media interfacing element 871 instructs resistance measurement element 872 to perform resistance measurements on corresponding well structures to determine positioning of embedded magnetic particles.

Resistance measurement element 872 determines electrical resistances of a set of well structures related to positioning within the set of well structures of associated magnetic particles, and converts the electrical resistances into indications of read data. Resistance measurement element 872 thus reads data states over the well connections by at least determining electrical resistances of the well structures related to the positioning of the magnetic particles in the well structures.

Well heating control element 873 directs an increase in thermal states of suspension material comprising well structures to alter corresponding viscosities of the well structures. Well heating control element 873 might direct a heating of selected well structures in at least a portion of an array to alter a material state of a well structure, such as to reduce well structure viscosity to below a threshold viscosity or to change a well structure material phase from solid to liquid. The array of well structures might be subdivided into zones each having separate control by well heating control element 873 over application of the increase in thermal states providing for concurrent writing of corresponding data states into the well structures among different zones.

Magnetic field control element 874 applies a field, such as a magnetic field, to well structures with altered viscosities to move embedded magnetic particles in accordance with desired altered positioning. Magnetic field control element 874 can provide for one-dimensional linear positioning, two-dimensional planar positioning, and three-dimensional volumetric positioning of magnetic particles, which may include operations in conjunction with well heating control element 873 to increase thermal states of only selected portions of well structures. An array of well structures might be subdivided into zones each having separate control by magnetic field control element 874 over application of the fields providing for concurrent writing of corresponding data states into the well structures among different zones.

Figure 9:
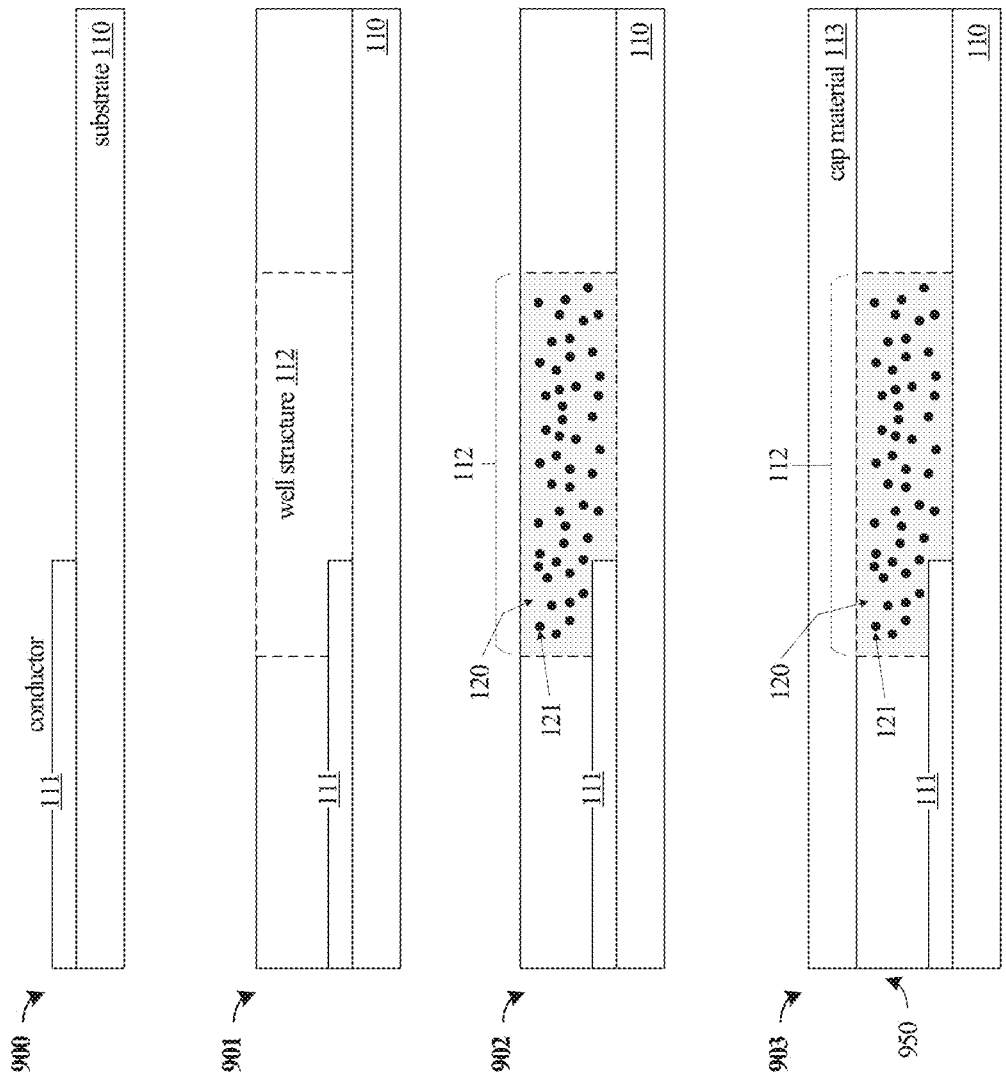
FIG. 9 illustrates example manufacturing operations in accordance with certain embodiments of the present disclosure.

FIG. 9 illustrates example manufacturing operations in accordance with certain embodiments of the present disclosure. FIG. 9 shows cross-sectional views highlighting example manufacturing operations 900-903, which can be used to produce memory device 950 or various memory devices discussed herein. The schematic or simplified representations in FIG. 9 are intended to illustrate example operations, but suitable manufacturing techniques are not limited to these representations. Techniques represented by FIG. 9 include additive manufacturing techniques, various microfabrication techniques, or techniques found in semiconductor wafer processing and microfabrication, such as photo-lithography, diffusing, deposition, epitaxial growth, etching, annealing, and ion implanting, among others.

In operation 900, substrate 110 is formed as an organic or semiconductor substrate, including vinyl substrates, polymer substrates, indium gallium arsenide (InGaAs), or other substrates. Electrical conductors are formed on the substrate, which are employed as the individual links for well structures, such as row/column connections. Electrical conductors can be formed using various metallization, doped semiconductors, vapor deposited wire structures, or other suitable conductor structures and techniques.

Operation 901 includes formation of well structure 112. Well structure 112 can be formed by depositing a material onto substrate 110 having a target thickness followed by a masking/etching process to form a cavity comprising well structure if not selectively deposited 112. In operation 902, well structure 112 can be filled with suspension material 120 having magnetic particles 121 embedded therein. After well structure 112 is filled, cap material 113 can be applied or deposited to seal well structure 112 and prevent escape of suspension material 120 and magnetic particles 121.

As shown in FIG. 9, more than one magnetic particle can be included in suspension material 120, and these magnetic particles can be added or injected as a mixture with suspension material 120 or separately from suspension material 120. Suspension material 120 might be injected into well structure 112 in a low viscosity state or liquid phase, and then allowed to change to a solid phase or higher viscosity state once magnetic particles have been established therein. The multiple magnetic particles can be agglomerated to act as a single bulk/combined particle, or may remain separate when more than one magnetic particle is employed individually in a well structure. The agglomeration process can include application of an initial external field to establish a clumping or gathering of the individual particles into a single, combined mass.

Memory device 950 can be mated or positioned proximate to another set of layers or substrates comprising control circuitry, which may comprise a semiconductor substrate, such as silicon. Further layers might be provided that houses heating elements or field elements, and comprise various metallic materials and magnetic materials. In such layers, an array of miniaturized electromagnets or selectable magnetic control elements can be formed. Interconnect can be provided among the various layers as needed for data exchange, control links, and power transfer. Thus, an integrated circuit device can be provided that has several layers and provides a memory array, control circuitry, and field elements combined into a stacked arrangement.

The illustrations of the embodiments described herein are intended to provide a general understanding of the structure of the various embodiments. While several implementations are described in connection with these illustrations of the embodiments, the disclosure is not limited to the implementations disclosed herein. On the contrary, the intent is to cover all alternatives, modifications, and equivalents. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and illustrations included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A data storage apparatus comprising:
   a well structure comprising a suspension medium having a material state comprising an alterable viscosity property or an alterable material phase property providing selectable mobility of a magnetic particle within the well structure;
   the magnetic particle disposed in at least a portion of the well structure; and
   a control system configured to represent a data state corresponding to a positioning of the magnetic particle within the well structure, the magnetic particle moved responsive to an applied field and a present material state of the suspension medium.

2. The data storage apparatus of claim 1, wherein the material state is altered based on a thermal state of the suspension medium; and comprising:
   the control system configured to alter the material state by directing a heating of the suspension medium.

3. The data storage apparatus of claim 2, wherein the heating comprises a resistive heating provided by terminals employed to read the data state from the well structure by determining an electrical resistance of the well structure.

4. The data storage apparatus of claim 2, wherein the heating comprises an oscillatory motion applied to the magnetic particle by the field that induces the heating of the suspension medium.

5. The data storage apparatus of claim 1, wherein the alterable viscosity property or the alterable material phase property provide the selectable mobility of the magnetic particle within the well structure based at least on a density of the suspension medium selected to be within a target range of density of the magnetic particle.

6. The data storage apparatus of claim 1, comprising:
   the control system configured to read the data state by at least determining an electrical resistance of the well structure related to the positioning of the magnetic particle in the well structure.

7. The data storage apparatus of claim 1, comprising:
the control system configured to write the data state by at least directing application of the field to the magnetic particle to move the magnetic particle to a target position in the well structure that alters an electrical resistance of the well structure representing the data state.

8. The data storage apparatus of claim 1, comprising:
the control system configured to write the data state by at least directing a heating of the suspension medium to alter the material state to reduce the viscosity or change the material phase and subsequently direct application of the field to the magnetic particle to move the magnetic particle to a target position in the well structure that alters an electrical resistance of the well structure representing the data state.

9. The data storage apparatus of claim 1, wherein the positioning of the magnetic particle within the well structure comprises at least one among one-dimensional linear positioning, two-dimensional planar positioning, and three-dimensional volumetric positioning.

10. A system, comprising:
an array of well structures comprising a suspension medium having a material state comprising an alterable viscosity property or an alterable material phase property providing selectable mobility of magnetic particles within the well structures;
a corresponding magnetic particle disposed within each of the well structures;
a field generator configured to selectively apply a field to at least a portion of the array;
well connections conductively coupling each of the well structures to a control element; and
the control element configured to direct selective application of the field to the array and store data states by altering positioning of the magnetic particles within the well structures based on a present material state of the suspension medium, and read the data states over the well connections as electrical properties of the well structures.

11. The system of claim 10, wherein the material state is alterable based on a thermal state of the suspension medium; and comprising:
the control element configured to direct a heating of selected suspension media in at least the portion of the array to alter the material state of the selected suspension media.

12. The system of claim 11, wherein the heating of the selected suspension media is achieved by at least one among a resistive heating of the suspension medium, optical heating of the suspension medium, radio frequency heating of the suspension medium, and oscillatory heating of the suspension medium by vibration of the magnetic particles.

13. The system of claim 11, wherein the heating of the selected suspension media comprises heating provided by electrical current directed over selected well connections.

14. The system of claim 10, wherein the alterable viscosity property or the alterable material phase property provide selectable mobility of the magnetic particles within the well structures based at least on a density of the suspension medium selected to be within a target range of density of the magnetic particles.

15. The system of claim 10, wherein the array of well structures is subdivided into zones each having separate control over application of the field providing for concurrent writing of corresponding data states into the well structures among different zones.

16. The system of claim 10, comprising:
the control element configured to read the data states over the well connections by at least determining electrical properties of the well structures related to the positioning of the magnetic particles in the well structures.

17. The system of claim 10, wherein the positioning of the magnetic particles within the well structures comprises at least one among one-dimensional linear positioning, two-dimensional planar positioning, and three-dimensional volumetric positioning.

* * * * *